US011506436B2

United States Patent
An et al.

(10) Patent No.: US 11,506,436 B2
(45) Date of Patent: Nov. 22, 2022

(54) METHOD FOR CONTROLLING FREEZING OF INDOOR UNIT, OUTDOOR UNIT AND/OR UNIT CONNECTION PIPE OF AIR CONDITIONER

(71) Applicants: Qingdao Haier Air-conditioning Electronic Co., Ltd, Shandong (CN); Haier Smart Home Co., Ltd., Shandong (CN)

(72) Inventors: Chao An, Qingdao (CN); Chao Gu, Qingdao (CN)

(73) Assignees: Qingdao Haier Air-conditioning Electronic Co., Ltd, Qingdao (CN); Haier Smart Home Co., Ltd., Qingdao (CN)

( * ) Notice: Subject to any disclaimer, the term of this patent is extended or adjusted under 35 U.S.C. 154(b) by 0 days.

(21) Appl. No.: 16/957,477

(22) PCT Filed: Oct. 18, 2018

(86) PCT No.: PCT/CN2018/110792
§ 371 (c)(1),
(2) Date: Jun. 24, 2020

(87) PCT Pub. No.: WO2019/128396
PCT Pub. Date: Jul. 4, 2019

(65) Prior Publication Data
US 2021/0071923 A1 Mar. 11, 2021

(30) Foreign Application Priority Data
Dec. 25, 2017 (CN) .......................... 201711421568.0

(51) Int. Cl.
*F25B 49/02* (2006.01)

(52) U.S. Cl.
CPC ........ *F25B 49/022* (2013.01); *F25B 2500/27* (2013.01); *F25B 2600/024* (2013.01);
(Continued)

(58) Field of Classification Search
CPC ................. F25B 49/022; F25B 49/025; F25B 2500/27; F25B 2600/024; F25B 2600/0253; F25B 2700/2106; F25B 2700/21151
See application file for complete search history.

(56) References Cited

U.S. PATENT DOCUMENTS 5,247,989 A * 9/1993 Benevelli ................ F25B 41/20
165/263
5,797,729 A * 8/1998 Rafuse, Jr. ............... F04C 28/08
417/3

(Continued)

FOREIGN PATENT DOCUMENTS

CN 102434943 A 5/2012
CN 103982980 A 8/2014
(Continued)

OTHER PUBLICATIONS

CN 104566645 (English Translation) (Year: 2015).*
International Search Report dated Jan. 21, 2019 in corresponding International application No. PCT/CN2018/110792; 8 pages.

*Primary Examiner* — Jonathan Bradford
(74) *Attorney, Agent, or Firm* — Maier & Maier, PLLC

(57) ABSTRACT

A control method for an air conditioner comprising a compressor and an outdoor unit, wherein the control method includes: obtaining a suction temperature of the outdoor unit; and selectively adjusting the frequency of the compressor according to the suction temperature of the outdoor unit.

5 Claims, 2 Drawing Sheets

(52) U.S. Cl.
CPC ............... *F25B 2700/2106* (2013.01); *F25B 2700/21151* (2013.01)

(56) References Cited

U.S. PATENT DOCUMENTS

| | | | | |
|---|---|---|---|---|
| 6,622,500 | B1* | 9/2003 | Archibald | B60H 1/3205 62/173 |
| 2014/0033744 | A1* | 2/2014 | Kim | F25B 49/025 62/80 |

FOREIGN PATENT DOCUMENTS

| | | | |
|---|---|---|---|
| CN | 104566645 | A | 4/2015 |
| CN | 105485865 | A | 4/2016 |
| CN | 106705361 | A | 5/2017 |
| CN | 107152758 | A | 9/2017 |
| CN | 108224703 | A | 6/2018 |
| JP | 2009204168 | A | 9/2009 |
| KR | 20110138669 | A | 12/2011 |

\* cited by examiner

METHOD FOR CONTROLLING FREEZING OF INDOOR UNIT, OUTDOOR UNIT AND/OR UNIT CONNECTION PIPE OF AIR CONDITIONER

FIELD

The present disclosure belongs to the technical field of air conditioners, and in particular relates to a control method for an air conditioner.

BACKGROUND

During the cooling operation of the air conditioner, due to various reasons such as low indoor and outdoor ambient temperatures, long piping connection, failure of a detection device of indoor unit coil temperature and lack of freon, the indoor unit, unit connection pipe and outdoor unit may freeze, which in turn causes undesired phenomena such as poor cooling effect, water leakage, and pipe cracks, thus seriously affecting the user experience.

In the related art, an indoor unit coil temperature sensor or a pressure switch are typically used for anti-freezing control. This control scheme has the following disadvantages: firstly, the indoor unit coil temperature sensor is prone to failure (such as damage or incorrect plug-in connection), thus making it impossible to accurately detect the temperature and resulting in the failure of anti-freezing protection and freezing of the indoor unit; secondly, in the case of long piping, pressure loss is likely to occur, resulting in the pressure on the low-pressure side being lower than the normal range, which further causes freezing of the suction pipe and the outdoor unit; thirdly, when the air conditioning system lacks freon, temperature detection by the indoor unit coil temperature sensor may also be inaccurate, resulting in the failure of anti-freezing protection and freezing of the indoor unit; moreover, the pressure switch is also prone to failure, which will cause the failure of anti-freezing protection and freezing of the indoor unit.

Therefore, there is a need in the art for a new control method for an air conditioner to solve the above problems.

SUMMARY

In order to solve the above problem in the related art, that is, to solve the problem that the indoor unit, outdoor unit and unit connection pipe of an air conditioner may easily freeze to cause phenomena such as poor cooling effect of the air conditioner, water leakage of the air conditioner or pipe cracks, the present disclosure provides a control method for an air conditioner, wherein the air conditioner includes a compressor and an outdoor unit, and the control method includes: acquiring a suction temperature of the outdoor unit; and selectively adjusting the frequency of the compressor according to the suction temperature of the outdoor unit.

In a preferred technical solution of the above control method, the step of "selectively adjusting the frequency of the compressor according to the suction temperature of the outdoor unit" includes: operating the compressor at a decreased frequency, if the suction temperature of the outdoor unit is lower than a first preset temperature.

In a preferred technical solution of the above control method, the step of "selectively adjusting the frequency of the compressor according to the suction temperature of the outdoor unit" further includes: maintaining the operating frequency of the compressor unchanged, if the suction temperature of the outdoor unit is higher than or equal to the first preset temperature and lower than or equal to a second preset temperature, the first preset temperature being lower than the second preset temperature.

In a preferred technical solution of the above control method, the step of "selectively adjusting the frequency of the compressor according to the suction temperature of the outdoor unit" further includes: operating the compressor at an increased frequency, if the suction temperature of the outdoor unit is higher than the second preset temperature and lower than or equal to a third preset temperature, the second preset temperature being lower than the third preset temperature.

In a preferred technical solution of the above control method, the control method further includes: acquiring an outdoor ambient temperature; and determining values of the first preset temperature, the second preset temperature and the third preset temperature according to the outdoor ambient temperature.

In a preferred technical solution of the above control method, the control method further includes: after the compressor has been operated for a first preset duration, if the suction temperature of the outdoor unit is lower than a fourth preset temperature for a second preset duration, stopping the operation of the compressor for a third preset duration.

In a preferred technical solution of the above control method, the control method further includes: after stopping the operation, if the suction temperature of the outdoor unit becomes higher than or equal to a fifth preset temperature, resuming the operation of the compressor, the fourth preset temperature being lower than the fifth preset temperature.

In a preferred technical solution of the above control method, before the step of "selectively adjusting the frequency of the compressor according to the suction temperature of the outdoor unit", the control method further includes: acquiring an indoor unit coil temperature of the air conditioner; wherein the frequency of the compressor is selectively adjusted according to the suction temperature of the outdoor unit only when the indoor unit coil temperature is higher than a sixth preset temperature.

In a preferred technical solution of the above control method, the outdoor ambient temperature is 15 degrees Celsius.

In a preferred technical solution of the above control method, the sixth preset temperature is 10 degrees Celsius.

It can be understood by those skilled in the art that in the preferred technical solutions of the present disclosure, the suction temperature of the outdoor unit is acquired; that is, the compressor is operated at a decreased frequency if the suction temperature of the outdoor unit is lower than the first preset temperature; the operating frequency of the compressor is maintained unchanged if the suction temperature of the outdoor unit is higher than or equal to the first preset temperature and lower than or equal to the second preset temperature; and the compressor is operated at an increased frequency if the suction temperature of the outdoor unit is higher than the second preset temperature and lower than or equal to the third preset temperature, the second preset temperature being lower than the third preset temperature. With these arrangements, that is, by firstly determining values of the first preset temperature, the second preset temperature and the third preset temperature according to the outdoor ambient temperature, the frequency of the compressor is correspondingly adjusted for different temperature intervals. By adopting the above control method of the present disclosure, even in the case where the indoor unit coil temperature sensor fails or the detection is inaccurate, the frequency of the compressor can be adjusted according to the suction temperature of the outdoor unit, thereby ensuring that the indoor unit coil does not freeze and further effectively realizing anti-freezing protection for the air conditioner during the cooling operation. In addition, even if the indoor unit and the outdoor unit are connected by long piping, the pressure on the low-pressure side will not be lower than the normal range, so that neither the unit connection pipe nor the condenser of the outdoor unit will freeze. In other words, the control method of the present disclosure can effectively solve the problem that the indoor unit, the outdoor unit and the unit connection pipe may easily freeze.

Further, different values of the first preset temperature, the second preset temperature and the third preset temperature are determined according to the outdoor ambient temperature, so that temperature intervals can be more accurately divided; then according to temperature interval of the suction temperature of the outdoor unit, the anti-freezing protection for the air conditioner is realized differently by increasing the frequency of the compressor, decreasing the frequency of the compressor or maintaining the frequency of the compressor unchanged, so that the problem that the indoor unit, the outdoor unit and the unit connection pipe may easily freeze is more effectively solved.

DETAILED DESCRIPTION

Hereinafter, preferred embodiments of the present disclosure will be described with reference to the accompanying drawings. It should be understood by those skilled in the art that these embodiments are only used to explain the technical principles of the present disclosure, and are not intended to limit the scope of protection of the present disclosure.

It should be noted that in the description of the present disclosure, terms "first", "second", "third", "fourth", "fifth" and "sixth" are used for descriptive purpose only, and should not be interpreted as indicating or implying relative importance.

In view of the problem pointed out in the "BACKGROUND OF THE INVENTION" that the indoor unit, outdoor unit and unit connection pipe of existing air conditioners may easily freeze to cause phenomena such as poor cooling effect of the air conditioner, water leakage of the air conditioner or pipe cracks, the present disclosure provides a control method for an air conditioner, which aims to avoid the freezing of the indoor unit, outdoor unit and unit connection pipe of the air conditioner, thereby effectively solving the problem that the indoor unit, the outdoor unit and the unit connection pipe may easily freeze.

Figure 1:
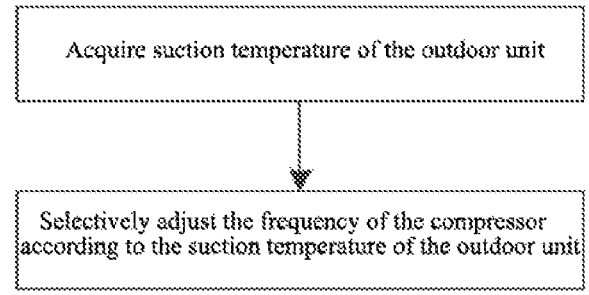
FIG. 1 is a schematic flowchart of a control method for an air conditioner of the present disclosure.

Specifically, reference is made to FIG. 1, which is a schematic flowchart of a control method for an air conditioner of the present disclosure. As shown in FIG. 1, the present disclosure provides a control method for an air conditioner, wherein the air conditioner includes a compressor and an outdoor unit, and the control method includes: acquiring a suction temperature of the outdoor unit; and selectively adjusting the frequency of the compressor according to the suction temperature of the outdoor unit.

In the present disclosure, with the operation of the air conditioner, the suction temperature of the outdoor unit will also change accordingly. According to the different suction temperatures of the outdoor unit, the frequency of the compressor can be controlled differently. In practical applications, the suction temperature of the outdoor unit can be detected in real time by an outdoor unit suction temperature sensor. Of course, the suction temperature of the outdoor unit may also be an experimental value obtained by those skilled in the art based on experiments under specific working conditions, or an empirical value obtained from experience. That is, those skilled in the art can choose any method to obtain the suction temperature of the outdoor unit according to the actual situation, as long as the operating frequency of the compressor can be adjusted according to the change of the suction temperature of the outdoor unit. By adjusting the frequency of the compressor, the compressor can be always operated within a suitable frequency range, which not only can ensure the cooling effect, but also can prevent the indoor unit and the outdoor unit of the air conditioner from freezing.

Preferably, the step of "selectively adjusting the frequency of the compressor according to the suction temperature of the outdoor unit" includes: operating the compressor at a decreased frequency, if the suction temperature of the outdoor unit is lower than a first preset temperature. That is, according to the setting of the first preset temperature, an initial conclusion of operating the compressor at a decreased frequency can be given. Those skilled in the art can flexibly set the specific value of the first preset temperature in practical applications, as long as the boundary point determined by the first preset temperature can give the conclusion that the compressor needs to be operated at a decreased frequency, and the air conditioner will not freeze after the adjustment of the operating frequency of the compressor.

Further, the step of "selectively adjusting the frequency of the compressor according to the suction temperature of the outdoor unit" further includes: maintaining the operating frequency of the compressor unchanged, if the suction temperature of the outdoor unit is higher than or equal to the first preset temperature and lower than or equal to a second preset temperature, the first preset temperature being lower than the second preset temperature. Similar to the first preset temperature, those skilled in the art can flexibly set the specific value of the second preset temperature in practical applications, as long as the boundary points determined by the first preset temperature and the second preset temperature can give the conclusion that the current operating frequency of the compressor needs to be maintained unchanged, and the air conditioner will not freeze.

Still further, the step of "selectively adjusting the frequency of the compressor according to the suction temperature of the outdoor unit" further includes: operating the compressor at an increased frequency, if the suction temperature of the outdoor unit is higher than the second preset temperature and lower than or equal to a third preset temperature, the second preset temperature being lower than the third preset temperature. Similar to the first preset temperature and the second preset temperature, those skilled in the art can flexibly set the specific value of the third preset temperature in practical applications, as long as the boundary points determined by the second preset temperature and the third preset temperature can give the conclusion that the compressor needs to be operated at an increased frequency, and the air conditioner will not freeze after the adjustment of the operating frequency of the compressor.

By setting the first preset temperature, the second preset temperature and the third preset temperature as described above, the suction temperature of the outdoor unit can be divided into different temperature intervals, and the compressor can be adjusted accordingly within each temperature interval and the compressor can be operated at the most suitable frequency. This method is more advantageous for the adjustment of the compressor frequency. At the same time, by detecting the suction temperature of the outdoor unit in real time and adjusting the compressor frequency in real time, a situation that the operating frequency of the compressor is too high or too low can be effectively avoided, thereby preventing the indoor unit, outdoor unit and unit connection pipe of the air conditioner from freezing.

It should be noted that in the above technical solution of the present disclosure, the temperature intervals divided according to the first preset temperature, the second preset temperature and the third preset temperature may be further divided. For example, when the suction temperature of the outdoor unit is higher than the first preset temperature and lower than or equal to the second preset temperature, the temperature interval between the first preset temperature and the second preset temperature may be re-divided into multiple temperature sub-intervals, and different adjustment strategies for the compressor frequency are set within the temperature sub-intervals. Those skilled in the art may set the same or different ways of adjusting the compressor frequency according to different temperature intervals in practical applications, so that the air conditioner can be operated stably in different environments and the indoor unit, outdoor unit and unit connection pipe can be effectively prevented from freezing.

In addition, it should also be noted that when controlling the compressor frequency to increase/decrease, the compressor frequency may be controlled to increase/decrease slowly, or the compressor frequency may be controlled to increase/decrease fast. In practice, those skilled in the art may flexibly set the adjustment speed of increasing/decreasing the compressor frequency, as long as the speed setting enables the compressor frequency to smoothly increase/decrease.

Preferably, the control method of the present disclosure further includes: acquiring an outdoor ambient temperature; and determining values of the first preset temperature, the second preset temperature and the third preset temperature according to the outdoor ambient temperature. The outdoor ambient temperature may be detected in real time by an outdoor unit suction temperature sensor disposed on the outdoor unit, or may be an experimental value obtained by those skilled in the art based on experiments under specific working conditions, or an empirical value obtained from experience. By detecting the outdoor ambient temperature in real time, as the outdoor ambient temperature changes, the settings of the first preset temperature, the second preset temperature and the third preset temperature are adjusted in real time, and then the frequency change of the compressor is adjusted in real time, so that the indoor unit, outdoor unit and unit connection pipe of the air conditioner can be effectively prevented from freezing in different temperature environments thereof.

In a possible situation, the outdoor ambient temperature is divided into two temperature intervals by setting a temperature threshold, wherein if the outdoor ambient temperature is higher than the temperature threshold, it indicates that the outdoor ambient temperature is high, so the values of the first preset temperature, the second preset temperature and the third preset temperature can be set to slightly higher temperatures accordingly; and if the outdoor ambient temperature is lower than or equal to the temperature threshold, it indicates that the outdoor ambient temperature is low, so the values of the first preset temperature, the second preset temperature and the third preset temperature can be set to slightly lower temperatures accordingly. The specific values of the first preset temperature, the second preset temperature and the third preset temperature need to be determined according to the detection value of the outdoor ambient temperature. For example, the temperature threshold can be set to 15 degrees Celsius. Of course, this is not limiting, and the temperature threshold may also be other temperature values, as long as those skilled in the art can distinguish a higher outdoor ambient temperature and a lower outdoor ambient temperature at the boundary point determined by the actual temperature threshold.

In a preferred embodiment, the above control method further includes: after the compressor has been operated for a first preset duration, if the suction temperature of the outdoor unit is lower than a fourth preset temperature for a second preset duration, stopping the operation of the compressor for a third preset duration. In practical applications, the fourth preset temperature may be set to be lower than the above first preset temperature. The fourth preset temperature may be an experimental temperature value obtained by those skilled in the art based on experiments under specific working conditions, or may be an empirical temperature value obtained from experience. Those skilled in the art can flexibly set the specific temperature value of the fourth preset temperature in practical applications, as long as the boundary point determined by the fourth preset temperature can give the conclusion that the operation of the compressor needs to be stopped, and the operating mode of the compressor and the anti-freezing function of the air conditioner can be optimized. In addition, the first preset duration, the second preset duration and the third preset duration can be flexibly adjusted and set according to actual conditions, as long as the boundary points determined by the above-mentioned first preset duration, the second preset duration, and the third preset duration can optimize the anti-freezing function of the air conditioner.

Further, the control method further includes: after stopping the operation of the compressor, if the suction temperature of the outdoor unit becomes higher than or equal to a fifth preset temperature, resuming the operation of the compressor, the fourth preset temperature being lower than the fifth preset temperature. That is, after the operation of the compressor has been stopped for the third preset duration, if the suction temperature of the outdoor unit rises to or above the fifth preset temperature, the operation of the compressor needs to be resumed. In practical applications, the fifth preset temperature may be set to be equal to the above-mentioned third preset temperature. Of course, this is not limiting, and the fifth preset temperature may also be other temperature values. In practical applications, those skilled in the art may flexibly set the specific temperature value of the fifth preset temperature, as long as the boundary point determined by the fifth preset temperature can give the conclusion that the operation of the compressor needs to be resumed, and the operating mode of the compressor and the anti-freezing function of the air conditioner can be optimized.

Further preferably, before the step of "selectively adjusting the frequency of the compressor according to the suction temperature of the outdoor unit", the control method further includes: acquiring an indoor unit coil temperature of the air conditioner; wherein the frequency of the compressor is selectively adjusted according to the suction temperature of the outdoor unit only when the indoor unit coil temperature is higher than a sixth preset temperature. That is, according to the setting of the sixth preset temperature, it can be ensured that the above control method for the air conditioner is performed when the air conditioner is operated in a cooling mode at the maximum capacity so as to avoid problems such as the freezing of the outdoor unit, unit connection pipe and indoor unit of the air conditioner. The sixth preset temperature may be flexibly adjusted and set in practical applications, as long as the cooling operation of the air conditioner is not affected. For example, the sixth preset temperature may be set to 10 degrees Celsius. When the cooling operation of the air conditioner is ensured, the temperature interval from which the value of the suction temperature of the outdoor unit is selected is divided according to the outdoor ambient temperature, and the suction temperature of the outdoor unit is detected by the outdoor unit suction temperature sensor; the frequency of the compressor is adjusted according to the temperature interval of the suction temperature of the outdoor unit, so that the anti-freezing protection of the air conditioner can be realized while ensuing the normal operation of the compressor.

It should be noted that the indoor unit coil temperature may be a temperature value detected by the indoor unit coil temperature sensor, or may be an experimental temperature value obtained by those skilled in the art based on experiments under specific working conditions, or an empirical temperature value obtained from experience.

Figure 2:
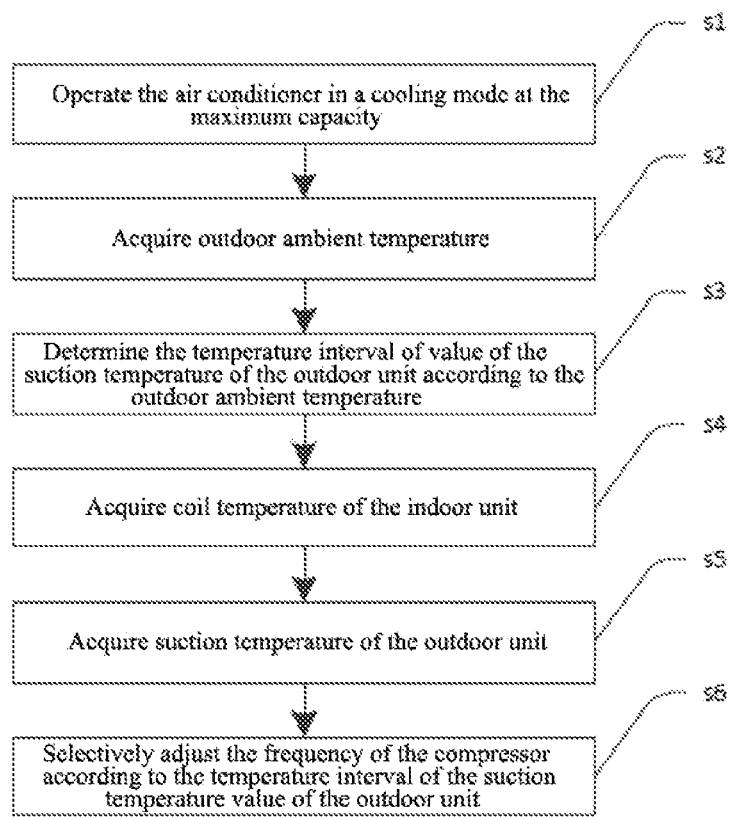
FIG. 2 is a schematic flowchart of a first embodiment of the control method for the air conditioner of the present disclosure.

In a preferred embodiment, as shown in FIG. 2, the above control method includes the following steps s1 to s6.

Step s1, operating the air conditioner in a cooling mode at the maximum capacity;

Step s2: acquiring the outdoor ambient temperature;

Step s3: determining the temperature interval of the suction temperature of the outdoor unit according to the outdoor ambient temperature;

Step s4: acquiring the indoor unit coil temperature;

Step s5: acquiring the suction temperature of the outdoor unit; and

Step s6: selectively adjusting the frequency of the compressor according to the temperature interval of the suction temperature of the outdoor unit.

The ways of acquiring the outdoor ambient temperature, the indoor unit coil temperature and the suction temperature of the outdoor unit in steps s2, s4 and s5 are not limited to direct detection by temperature sensors, but may also be experimental temperature values obtained by those skilled in the art based on experiments under specific working conditions, or empirical temperature values obtained from experience.

In the above method, steps s1 and s2 may be executed sequentially or simultaneously, and steps s4 and s5 may be executed sequentially or simultaneously. Those skilled in the art may flexibly set the execution of steps s1 and s2 and the execution of steps s4 and s5 in practical applications, as long as the outdoor ambient temperature can be acquired through the setting.

Figure 3:
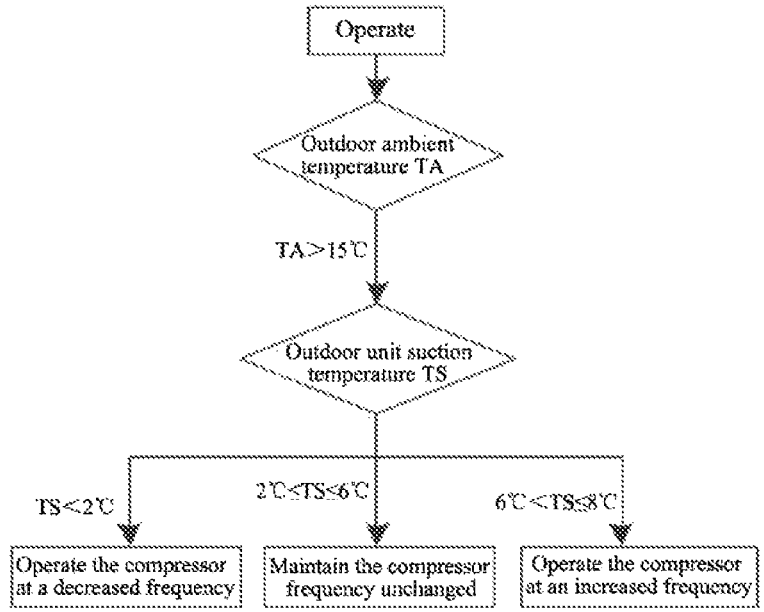
FIG. 3 is a schematic flowchart of a second embodiment of the control method for the air conditioner of the present disclosure.

The technical solution of the present disclosure is further explained below in combination with specific embodiments:

In a possible situation, as shown in FIG. 3, after the air conditioner is started, or while the air conditioner is started, the outdoor ambient temperature TA is detected by the outdoor ambient temperature sensor, and meanwhile the indoor unit coil temperature TM is detected by the indoor unit coil temperature sensor disposed on the air conditioner. When the air conditioner is operating normally, TM>10° C.; if TA>15° C., the first preset temperature value is set to 2° C., the second preset temperature value is set to 6° C., and the third preset temperature value is set to 8° C. Then, the outdoor unit suction temperature sensor is used to detect the suction temperature TS of the outdoor unit, and the value of TS is compared with the values of the first preset temperature, the second preset temperature, and the third preset temperature. If TS<2° C., the frequency of the compressor is decreased at a constant rate of 1 Hz/10 s; if 2° C.≤TS≤6° C., the frequency of the compressor is maintained unchanged; and if 6° C.<TS≤8° C., the frequency of the compressor is increased at a constant rate of 1 Hz/10 s.

During the operation of the compressor, the operation duration thereof is recorded. After the compressor has been operated for 6 minutes, if TS<−2° C. for 40 minutes, the operation of the compressor is stopped for a minimum duration of 5 minutes and a maximum duration of 9 minutes; when TS rises above 8° C., the compressor is started again and the normal operation of the compressor is resumed.

Figure 4:
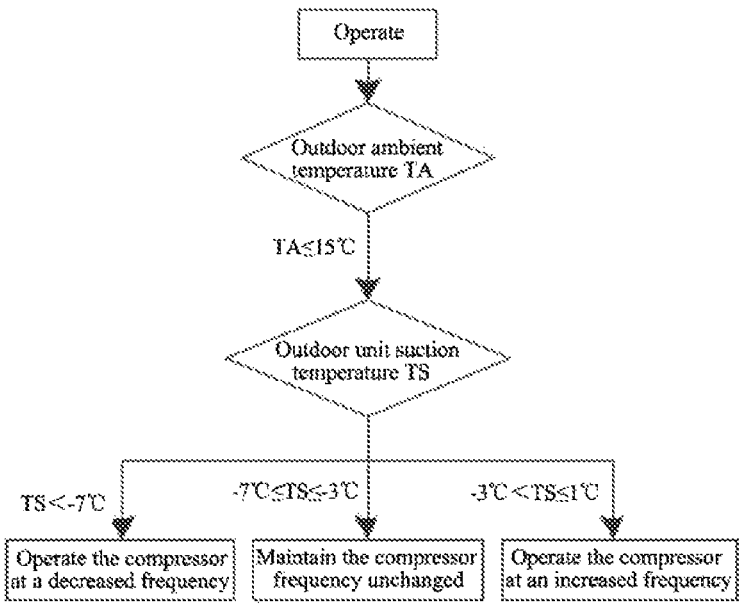
FIG. 4 is a schematic flowchart of a third embodiment of the control method for the air conditioner of the present disclosure.

In another possible situation, as shown in FIG. 4, after the air conditioner is started, or while the air conditioner is started, the outdoor ambient temperature TA is detected by the outdoor ambient temperature sensor, and meanwhile the indoor unit coil temperature TM is detected by the indoor unit coil temperature sensor disposed on the air conditioner. When the air conditioner is operating normally, TM>10° C.; if TA≤15° C., the first preset temperature value is set to −7° C., the second preset temperature value is set to −3° C., and the third preset temperature value is set to 1° C. Then, the outdoor unit suction temperature sensor is used to detect the suction temperature TS of the outdoor unit, and the value of TS is compared with the values of the first preset temperature, the second preset temperature, and the third preset temperature. If TS<−7° C., the frequency of the compressor is decreased at a constant rate of 1 Hz/10 s; if −7° C.≤TS≤−3° C., the frequency of the compressor is maintained unchanged; and if −3° C.<TS≤1° C., the frequency of the compressor is increased at a constant rate of 1 Hz/10 s.

During the operation of the compressor, the operation duration thereof is recorded. After the compressor has been operated for 6 minutes, if TS<−10° C. for 40 minutes, the operation of the compressor is stopped for a minimum duration of 5 minutes and a maximum duration of 9 minutes; when TS rises above 1° C., the compressor is started again and the normal operation of the compressor is resumed.

It should be understood that the specific values of the above parameters do not serve as limitations, but are only used to help understand the solutions.

Hitherto, the technical solutions of the present disclosure have been described in conjunction with the preferred embodiments shown in the accompanying drawings, but it is easily understood by those skilled in the art that the scope of protection of the present disclosure is obviously not limited to these specific embodiments. Without departing from the principle of the present disclosure, those skilled in the art can make equivalent changes or replacements to relevant technical features, and the technical solutions after these changes or replacements will fall within the scope of protection of the present disclosure.

What is claimed is:

1. A method for controlling freezing of an indoor unit, an outdoor unit and/or a unit connection pipe of an air conditioner including a compressor and the outdoor unit, the method comprising:
    acquiring outdoor ambient temperature; and
    determining values of a first preset temperature, a second preset temperature and a third preset temperature according to the outdoor ambient temperature, wherein the outdoor ambient temperature is divided into two temperature intervals by setting a temperature threshold, wherein if the outdoor ambient temperature is higher than the temperature threshold, the values of the first preset temperature, the second preset temperature and the third preset temperature are set to higher temperatures than the determined values, respectively; and if the outdoor ambient temperature is lower than or equal to the temperature threshold, the values of the first preset temperature, the second preset temperature and the third preset temperature are set to lower temperatures than the determined values, respectively;
    acquiring suction temperature of the outdoor unit and acquiring coil temperature of the indoor unit of the air conditioner; and
    selectively adjusting the frequency of the compressor according to the suction temperature of the outdoor unit only when the coil temperature of the indoor unit is higher than a sixth preset temperature, comprising the step of:
    operating the compressor at a decreased frequency if the suction temperature of the outdoor unit is lower than the first preset temperature;
    maintaining the operating frequency of the compressor unchanged if the suction temperature of the outdoor unit is higher than or equal to the first preset temperature and lower than or equal to the second preset temperature,
    operating the compressor at an increased frequency if the suction temperature of the outdoor unit is higher than the second preset temperature and lower than or equal to the third preset temperature,
    wherein the first preset temperature is lower than the second preset temperature and the second preset temperature is lower than the third preset temperature.

2. The method according to claim 1, further comprising:
    after the compressor has been operated for a first preset duration, if the suction temperature of the outdoor unit is lower than a fourth preset temperature for a second preset duration, stopping operation of the compressor for a third preset duration.

3. The method according to claim 2, further comprising:
    after stopping the operation, if the suction temperature of the outdoor unit becomes higher than or equal to a fifth preset temperature, resuming the operation of the compressor,
    wherein the fourth preset temperature is lower than the fifth preset temperature.

4. A method for controlling freezing of an indoor unit, an outdoor unit and/or a unit connection pipe of an air conditioner, the air conditioner including a compressor and the outdoor unit, the method comprising:
    acquiring suction temperature of the outdoor unit and outdoor ambient temperature;
    determining values of a first preset temperature, a second preset temperature and a third preset temperature according to the outdoor ambient temperature, wherein the outdoor ambient temperature is divided into two temperature intervals by setting a temperature threshold, wherein if the outdoor ambient temperature is higher than the temperature threshold, the values of the first preset temperature, the second preset temperature and the third preset temperature are set to higher temperatures than the determined values, respectively; and if the outdoor ambient temperature is lower than or equal to the temperature threshold, the values of the first preset temperature, the second preset temperature and the third preset temperature set to lower temperatures than the determined values, respectively;
    operating the compressor at a decreased frequency if the suction temperature of the outdoor unit is lower than the first preset temperature;
    maintaining an operating frequency of the compressor unchanged if the suction temperature of the outdoor unit is higher than or equal to the first preset temperature and lower than or equal to the second preset temperature which is higher than the first preset temperature;
    operating the compressor at an increased frequency if the suction temperature of the outdoor unit is higher than the second preset temperature and lower than or equal to the third preset temperature which is higher than the second preset temperature;
    after the compressor has been operated for a first preset duration, if the suction temperature of the outdoor unit is lower than a fourth preset temperature for a second preset duration, stopping operation of the compressor for a third preset duration; and
    after stopping the operation, if the suction temperature of the outdoor unit becomes higher than or equal to a fifth preset temperature, resuming the operation of the compressor, wherein the fourth preset temperature is lower than the fifth preset temperature.

5. The method according to claim 4, further comprising:
    acquiring coil temperature of the indoor unit of the air conditioner;
    wherein the frequency of the compressor is selectively adjusted according to the suction temperature of the outdoor unit only when the coil temperature of the indoor unit is higher than a sixth preset temperature.

* * * * *